(12) United States Patent
Cigal et al.

(10) Patent No.: US 9,945,259 B2
(45) Date of Patent: Apr. 17, 2018

(54) INTEGRATED FLEX SUPPORT AND FRONT CENTER BODY

(71) Applicant: UNITED TECHNOLOGIES CORPORATION, Farmington, CT (US)

(72) Inventors: Brian P. Cigal, Windsor, CT (US); Todd A. Davis, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 280 days.

(21) Appl. No.: 14/765,680

(22) PCT Filed: Mar. 14, 2014

(86) PCT No.: PCT/US2014/027560
§ 371 (c)(1),
(2) Date: Aug. 4, 2015

(87) PCT Pub. No.: WO2014/197081
PCT Pub. Date: Dec. 11, 2014

(65) Prior Publication Data
US 2016/0003105 A1   Jan. 7, 2016

Related U.S. Application Data

(60) Provisional application No. 61/790,616, filed on Mar. 15, 2013.

(51) Int. Cl.
*F01D 25/28* (2006.01)
*F02C 7/20* (2006.01)
(Continued)

(52) U.S. Cl.
CPC ............ *F01D 25/28* (2013.01); *F01D 25/04* (2013.01); *F01D 25/16* (2013.01); *F01D 25/162* (2013.01);
(Continued)

(58) Field of Classification Search
CPC ........ F01D 25/28; F01D 25/16; F01D 125/04; F01D 25/18; F05D 2220/32; F05D 2230/21; F05D 2230/10; F05D 2260/96
See application file for complete search history.

(56) References Cited

U.S. PATENT DOCUMENTS 4,177,638 A * 12/1979 Wood .................. F02C 7/06
                                                              60/39.512
5,890,874 A *  4/1999 Lambert ............. F01D 11/008
                                                              416/193 A
(Continued)

OTHER PUBLICATIONS

Extended European Search Report for related EP Application 14807893.4; dated Sep. 30, 2016, 9 pages.
(Continued)

*Primary Examiner* — Mark Laurenzi
*Assistant Examiner* — Shafiq Mian
(74) *Attorney, Agent, or Firm* — Cantor Colburn LLP (57) ABSTRACT

A gas turbine engine is provided. The gas turbine engine may include a geared architecture, a central body support and a bearing package. The geared architecture may interconnect a spool and a fan rotatable about an axis. The central body support may provide an annular wall for a core flow path and an integral flex support inwardly extending therefrom. The integral flex support may couple the geared architecture to the central body support. The bearing package may include a bearing support removably coupled to the integral flex support.

17 Claims, 5 Drawing Sheets

(51) Int. Cl.
- *F01D 25/16* (2006.01)
- *F02K 3/06* (2006.01)
- *F01D 25/04* (2006.01)
- *F01D 25/18* (2006.01)
- *F01D 25/24* (2006.01)

(52) U.S. Cl.
CPC ........... *F01D 25/164* (2013.01); *F01D 25/18* (2013.01); *F01D 25/243* (2013.01); *F02C 7/20* (2013.01); *F02K 3/06* (2013.01); *F05D 2220/32* (2013.01); *F05D 2220/327* (2013.01); *F05D 2230/10* (2013.01); *F05D 2230/21* (2013.01); *F05D 2260/30* (2013.01); *F05D 2260/40311* (2013.01); *F05D 2260/96* (2013.01)

(56) References Cited

U.S. PATENT DOCUMENTS

| | | | | |
|---|---|---|---|---|
| 7,025,566 | B2* | 4/2006 | Sasu | F01D 9/045 415/208.3 |
| 8,360,714 | B2* | 1/2013 | Otto | F01D 25/16 415/124.2 |
| 8,950,069 | B2* | 2/2015 | Ress, Jr. | F01D 9/041 164/47 |
| 2008/0008583 | A1* | 1/2008 | Suciu | F01D 9/042 415/208.1 |
| 2010/0043449 | A1* | 2/2010 | Commaret | F01D 9/023 60/796 |
| 2010/0105516 | A1* | 4/2010 | Sheridan | F01D 25/18 475/346 |
| 2010/0166545 | A1* | 7/2010 | Schuler | F01D 25/06 415/189 |
| 2010/0205930 | A1* | 8/2010 | Conete | F02K 1/04 60/226.1 |
| 2011/0105270 | A1* | 5/2011 | Matsuoka | F02C 7/36 475/331 |
| 2011/0286836 | A1 | 11/2011 | Davis | |
| 2012/0257960 | A1 | 10/2012 | Reinhardt et al. | |
| 2012/0260623 | A1 | 10/2012 | McCune et al. | |
| 2012/0260669 | A1* | 10/2012 | Davis | F01D 25/28 60/797 |
| 2012/0263579 | A1 | 10/2012 | Otto et al. | |
| 2012/0321447 | A1 | 12/2012 | Dijoud et al. | |

OTHER PUBLICATIONS

PCT International Preliminary Report on Patentability and Written Opinion of the International Searching Authority for International Application No. PCT/US2014/027560, dated Sep. 24, 2015, 9 pgs.
International Search Report for related International Application No. PCT/US14/27560; report dated Dec. 18, 2014.

\* cited by examiner

INTEGRATED FLEX SUPPORT AND FRONT CENTER BODY

CROSS-REFERENCE TO RELATED APPLICATION

This Application is a US National Stage under 35 USC § 371 of International Patent Application No. PCT/US14/27560 filed on Mar. 14, 2014, and claims priority under 35 USC § 119(e) to U.S. Provisional Patent Application Ser. No. 61/790,616 filed on Mar. 15, 2013.

FIELD OF THE DISCLOSURE

The present disclosure generally relates to a gas turbine engine, and more particularly, to a central body support for a gas turbine engine.

BACKGROUND OF THE DISCLOSURE

Gas turbine engines typically include one or more rotor shafts that transfer power and rotary motion from a turbine section to a compressor section and fan section. The rotor shafts are supported within an engine static structure, which is typically constructed of modules with individual case sections which are joined together at bolted flanges. The flanges form a joint capable of withstanding the variety of loads transmitted through the engine static structure. An ongoing issue for gas turbine engines is the ease and speed at which certain components in such engines can be serviced.

In a typical gas turbine engine, a front case section includes a central body support, or a front center body, which integrally extends to a bearing package. To suppress torsional loads and other vibrations within the engine, a flex support is fastened between the front center body and the geared architecture using a plurality of bolts. However, accessing the bolt pattern for the purposes of assembly or disassembly is difficult due to the proximity of neighboring components within the case section.

Although axially extending the position of the bolt pattern may provide better accessibility thereto, this necessitates multiple scallops to be formed within the flex support through which service tubes may be extended and attached to the oil manifold of the geared architecture. Such scallops, however, result in undesirable stress distribution within the flex support.

The present disclosure is directed at addressing one or more of the deficiencies set forth above.

SUMMARY OF THE DISCLOSURE

In accordance with one aspect of the disclosure, a gas turbine engine is provided. The gas turbine engine may include a geared architecture, a central body support, and a bearing package. The geared architecture may interconnect a spool and a fan rotatable about an axis. The central body support may provide an annular wall for a core flow path and an integral flex support inwardly extending therefrom. The integral flex support may couple the geared architecture to the central body support. The bearing package may include a bearing support removably coupled to the integral flex support.

In a refinement, the integral flex support may include at least one flex member configured to at least partially suppress vibrations within the gas turbine engine.

In a related refinement, the at least one flex member may be geometrically structured to at least partially suppress vibrations within the gas turbine engine.

In another related refinement, the at least one flex member may be configured to at least partially suppress vibrations between the central body support and at least the geared architecture.

In another refinement, the integral flex support may be disposed substantially aft of the geared architecture so as to provide sufficient axial clearance to an oil manifold associated with the geared architecture.

In another refinement, at least the integral flex support and the annular wall may be formed of a unitary body.

In another refinement, the integral flex support may be configured to form an oil seal with the bearing support. The oil seal may be configured to lubricate lower bearings associated with one or more exit guide vanes associated with the gas turbine engine.

In yet another refinement, the integral flex support may further include a retaining member configured to axially retain a fan assembly associated with the gas turbine engine.

In accordance with another aspect of the disclosure, a central body support for a gas turbine engine is provided. The central body support may include an outer annular wall, an inner annular wall, a plurality of vanes and an integral flex support. The inner annular wall may define a core flow path with the outer annular wall. The plurality of vanes may be circumferentially disposed between the outer and inner annular walls. The integral flex support may inwardly extend from the inner annular wall. The integral flex support may include at least one flex member configured to at least partially suppress vibrations within the gas turbine engine.

In a refinement, the at least one flex member may be geometrically structured to at least partially suppress vibrations within the gas turbine engine.

In another refinement, the integral flex support may be configured to couple to a geared architecture of the gas turbine engine.

In a related refinement, the at least one flex member may be configured to at least partially suppress vibrations between the inner annular wall and at least the geared architecture.

In another related refinement, the integral flex support may be disposed substantially aft of the geared architecture so as to provide sufficient axial clearance to an oil manifold associated with the geared architecture.

In another refinement, the integral flex support may be configured to removably couple to a bearing support associated with a bearing package of the gas turbine engine. The integral flex support may form an oil seal with the bearing support for lubricating lower bearings associated with one or more exit guide vanes.

In another refinement, the integral flex support may further include a retaining member configured to axially retain a fan assembly associated with the gas turbine engine.

In yet another refinement, at least the integral flex support and the inner annular wall may be formed of a unitary body.

In accordance with yet another aspect of the disclosure, a method of manufacturing a front architecture of a gas turbine engine is provided. The method may include the steps of casting a central body support with an annular wall for a core flow path and an integral stock piece inwardly extending therefrom, machining the integral stock piece to form an integral flex support having at least one flex member, and removably coupling a fore section of the integral flex support to a geared architecture and an aft section of the integral flex support to a bearing support.

In a refinement, the at least one flex member may be machined with at least one geometric structure configured to at least partially suppress vibrations between the central body support and at least the geared architecture.

In another refinement, the integral flex support may be machined to be disposed substantially aft of the geared architecture so as to provide sufficient axial clearance to an oil manifold associated with the geared architecture.

In yet another refinement, the integral flex support and the bearing support may be removably coupled to form an oil seal about lower bearings associated with one or more exit guide vanes.

These and other aspects of this disclosure will become more readily apparent upon reading the following detailed description when taken in conjunction with the accompanying drawings.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Figure 1:
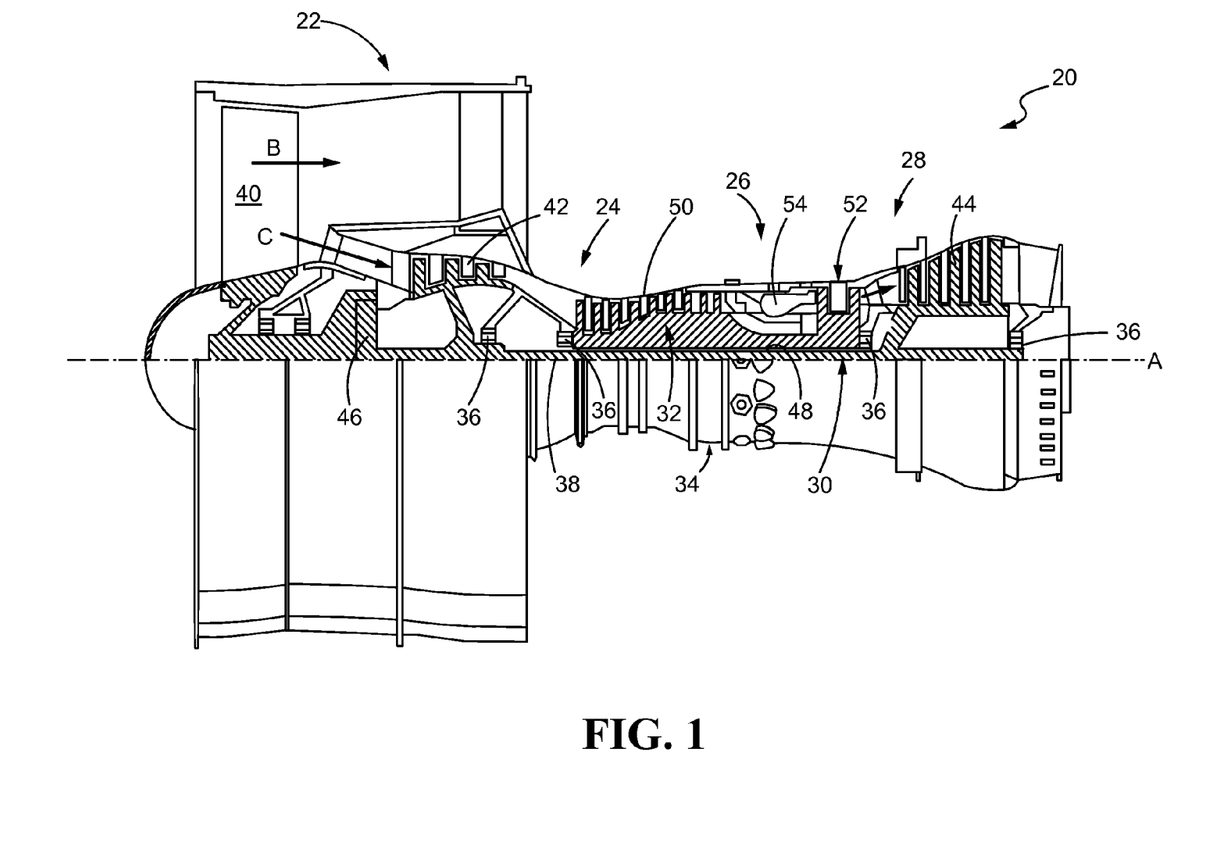
FIG. 1 is a schematic cross-section of an embodiment of a gas turbine engine.

Referring to FIG. 1, one schematic illustration of a gas turbine engine 20 that may employ an integrated flex support and front center body is provided. It is to be understood that some of the disclosed embodiments are shown for illustrative purposes and only presented as background for the various components of a general turbine engine. Other components of a gas turbine engine as well as controls therefor unnecessary for an understanding of the present disclosure are not described.

As shown in the embodiment of FIG. 1, the gas turbine engine 20 may be a two-spool turbofan generally incorporating a fan section 22, a compressor section 24, a combustor section 26 and a turbine section 28, all of which may generally be in axial alignment along a common central axis A. Although not shown, the engine 20 may additionally or alternatively include other systems or features, such as an augmentor section, or the like.

In the gas turbine engine 20 of FIG. 1, the fan section 22 may be configured to direct air along a bypass flow path B, while the compressor section 24 may be configured to direct air along a core flow path C for compression and communication into the combustor section 26, and subsequently, for expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 in FIG. 1 may generally include a low speed spool 30 and a high speed spool 32 mounted for rotation about the central axis A and relative to an engine static structure 34 via one or more bearing systems or packages 36. The low speed spool 30 may generally include an inner shaft 38 which interconnects a fan 40, a low pressure compressor section 42 and a low pressure turbine section 44. The inner shaft 38 may couple and rotatably communicate the fan 40 through a geared architecture 46 to drive the fan 40 at a lower speed than the low speed spool 30. Furthermore, one of the bearing packages 36 may be disposed within the compressor section 24 and configured to support a forward end of the inner shaft 38. It should be understood that various other suitable arrangements of bearing systems or packages 36 may be provided.

Similarly, the high speed spool 32 in FIG. 1 may generally include an outer shaft 48 which interconnects a high pressure compressor section 50 and high pressure turbine section 52, where the high pressure compressor 50 and the high pressure turbine 52 operate at relatively higher pressures than those of the corresponding low pressure compressor 42 and the low pressure turbine 44. A combustor 54 may also be arranged between the high pressure compressor 50 and the high pressure turbine 52. Airflow through the core flow path C may be compressed by the low pressure compressor 42 as well as the high pressure compressor 50 to be mixed with fuel and burned within the combustor 54. The airflow may then continue to be expanded over the high pressure turbine 52 and the low pressure turbine 44 thereby rotationally driving the respective low speed spool 30 and the high speed spool 32 in response to the expansion.

In one embodiment, the geared architecture 46 and the associated engine 20 may be arranged according to a high-bypass geared aircraft engine. For example, the geared architecture 46 may be an epicyclic gear train, such as a planetary gear system, or the like, including a sun gear, a ring gear, and one or more intermediate gears arranged circumferentially about the sun gear and generally intermeshing between the sun and ring gears. Moreover, the intermediate gears may be star gears, or the like, configured to be grounded to a flex support 56 against rotation about the central axis A. Furthermore, the sun gear may be supported by the low speed spool 30 while the ring gear may be interconnected to the fan 40. It should be understood, however, that the above configurations are only exemplary of one possible embodiment of the geared architecture 46 and associated engine 20, and that the present disclosure is applicable to other gas turbine engines including direct drive turbofans.

Figure 2:
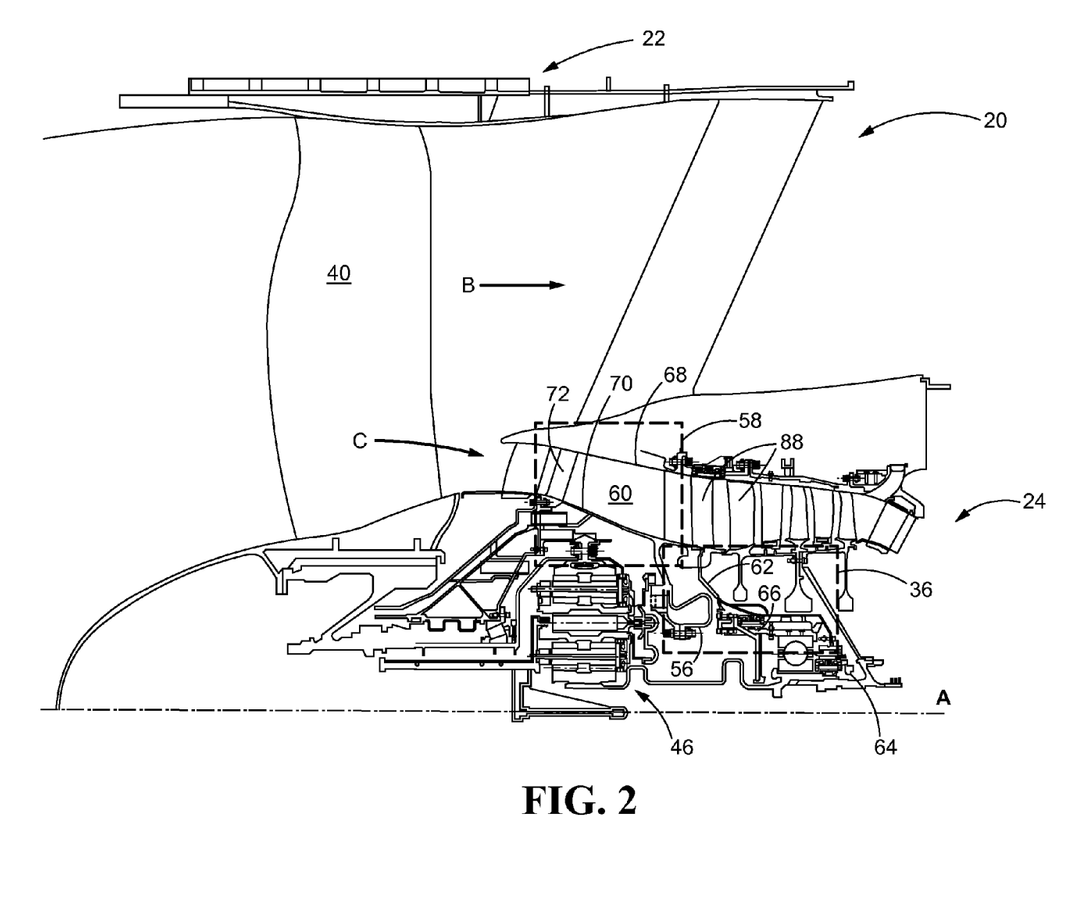
FIG. 2 is an enlarged cross-section of a front center body assembly portion of a gas turbine engine.
Figure 3:
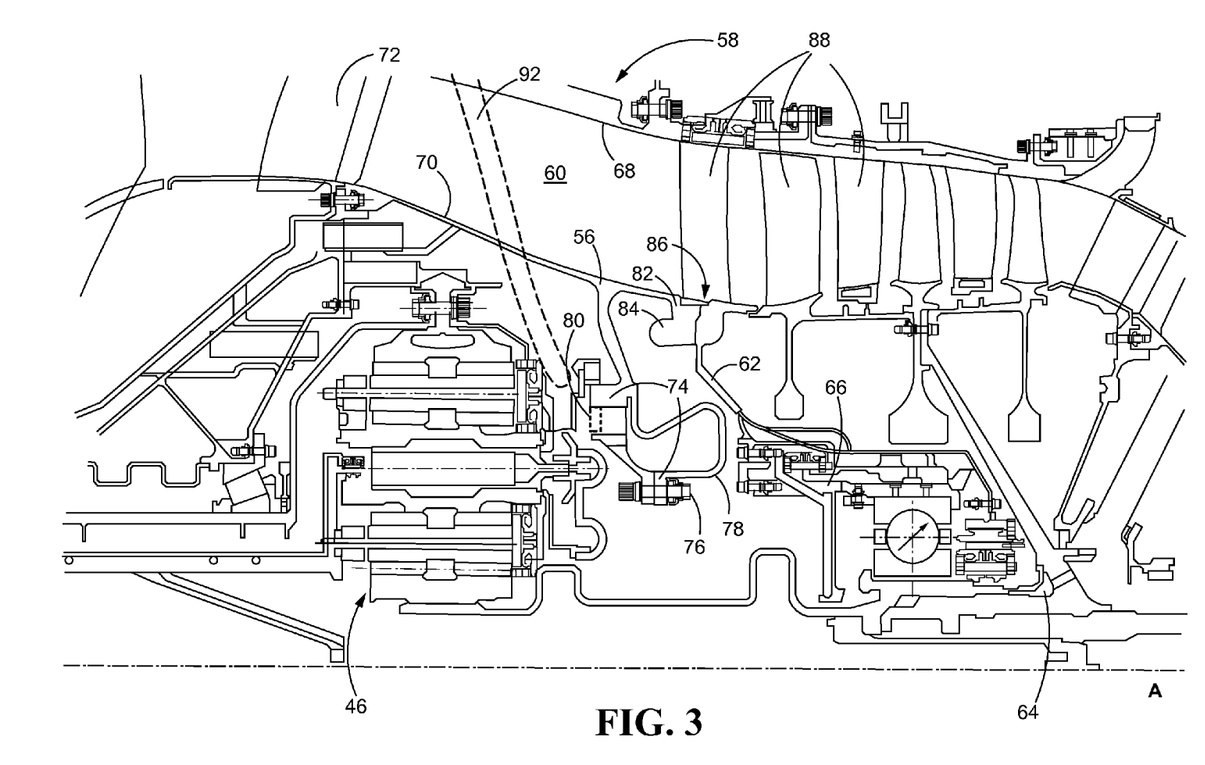
FIG. 3 is an enlarged cross-section of a front center body support having a flex support integrated therein.

Turning to FIGS. 2 and 3, the engine static structure 34 proximate the compressor section 24 may include a front center body assembly 58 disposed adjacent to a bearing support 62 which includes the bearing package 36 as well as a seal package 64 and a centering member 66. Furthermore, the front center body assembly 58 may generally include a central body support, or a front center body support 60, that forms a unitary body with the flex support 56 integral thereto. The front center body support 60 may include an outer annular wall 68 and an inner annular wall 70 through which the core flow path C may be directed. Additionally, a plurality of vanes 72 may be circumferentially disposed within the core flow path C and between the annular walls 68, 70 to provide a unitary structure therewith.

Figure 4:
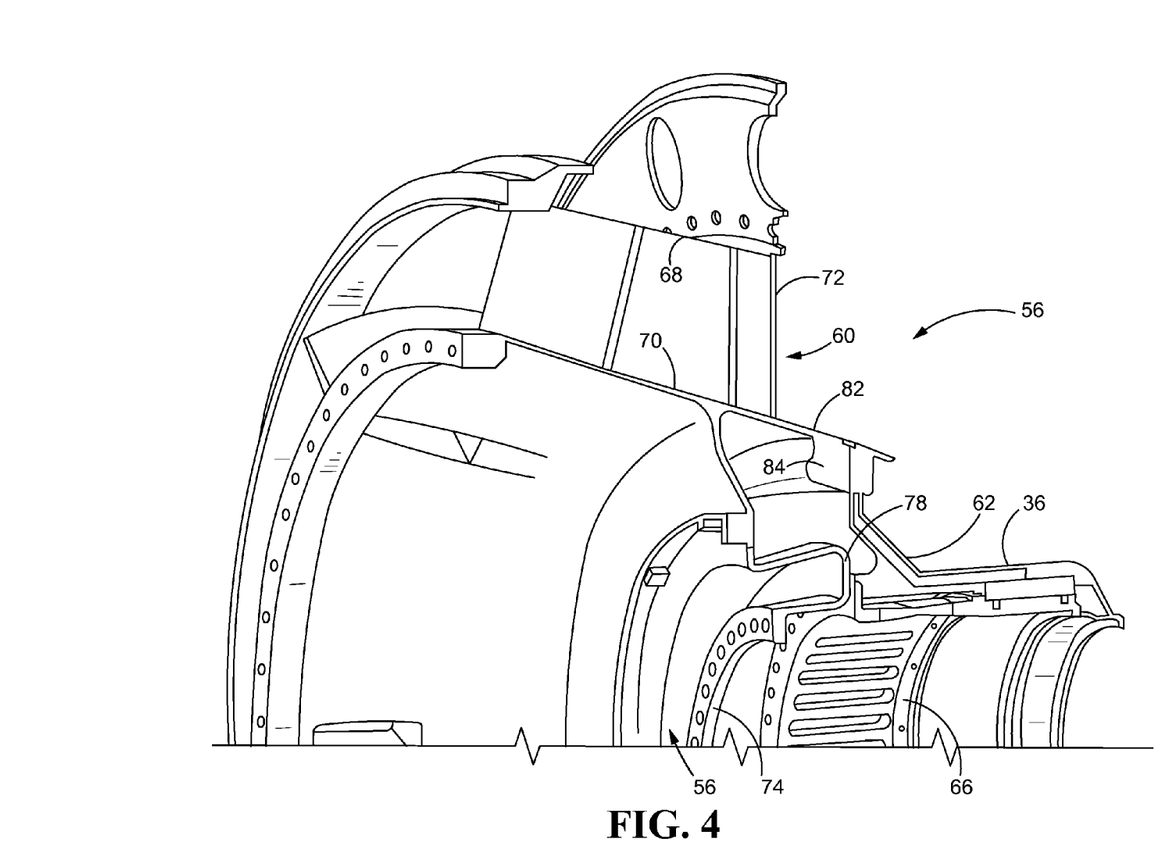
FIG. 4 is an enlarged perspective partial cross-section of a front center body support having an integrated flex support.

As shown in FIG. 4, the flex support 56 may be integral to the front center body support 62 and generally extend inwardly from the inner annular wall 70 and toward the geared architecture 46 to which a fore section 74 of the flex support 56 may be coupled using fasteners 76, such as bolts, or the like. Additionally, the integral flex support 56 may include one or more flex members 78 configured to at least partially suppress or absorb torsional loads and other vibrations which may exist between at least the front center body support 60 and the geared architecture 46. For example, the flex member 78 may be geometrically structured, such as with folds, bends, or the like, and configured to substantially isolate the engine static structure 34 from axial loads and stresses along the inner and/or outer shafts 38, 48 of the engine 20.

As shown in phantom lines in FIG. 3, the flex support 56 may optionally include one or more retaining members 80 configured to limit any substantial longitudinal movement of the geared architecture 46 along the central axis A and to serve as a safeguard catch mechanism for generally retaining components of the associated fan assembly 40. Furthermore, an aft section 82 of the flex support 56 of FIGS. 3 and 4 may be configured to removably couple with the bearing support 62 associated with the bearing package 36 using fasteners 76, such as bolts, or the like. Additionally or optionally, the aft section 82 of the flex support 56 and the bearing support 62 may be sealably coupled so as to create an oil seal 84, for instance, substantially surrounding the lower bearings 86 of one or more exit guide vanes 88 of the engine 20 for lubrication.

Still further, as shown in FIG. 3 for example, the flex support 56 integral thereto may be configured to provide sufficient axial clearance to an oil manifold 90 associated with the geared architecture 46. Specifically, the flex support 56 may be configured to extend from the front center body support 60 at an axial location that is sufficiently in the aft of the geared architecture 46 such that lateral service tubes 92, as shown in phantom lines in FIG. 3 for example, may be more easily extended to the associated oil manifold 90 with less obstruction. Moreover, integrating the flex support 56 into the front center body support 60 in such arrangements not only facilitates assembly and disassembly of the engine 20, but does so without hindering performance of the geared architecture 46 and without compromising the structural integrity of the flex support 56.

Figure 5:
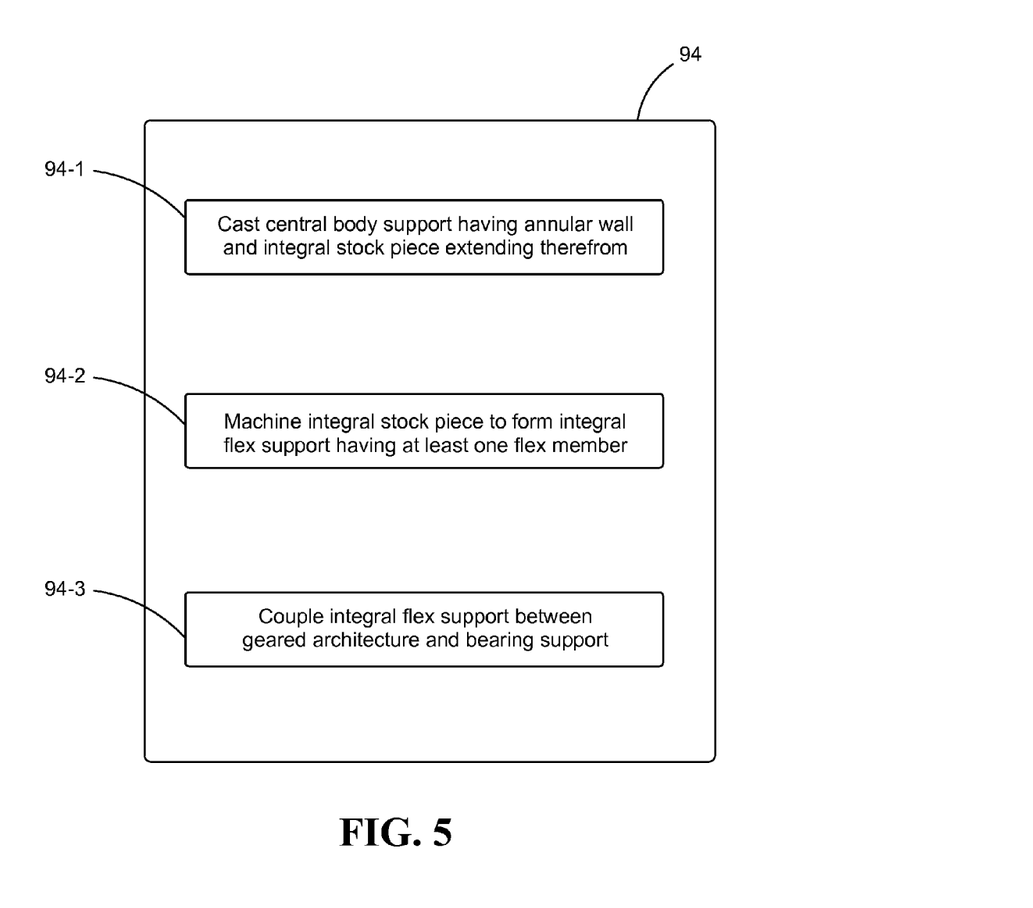
FIG. 5 is a flow diagram of a method of manufacturing a front architecture of a gas turbine engine.

Referring now to FIG. 5, one exemplary method 94 of manufacturing a front architecture of a gas turbine engine 20 is provided. As shown, the method 94 may generally include an initial step 94-1 of casting the central body support 60. In particular, the central body support 60 may be cast to include at least the inner annular wall 70 over which a core flow path C would be directed, as well as an integral stock piece from which the integral flex support 56 may be later formed, such that the flex support 56 forms a unitary body with at least the inner annular wall 70. Moreover, during step 94-1, the central body support 60 may be cast such that the integral stock piece extends from an axial location of the inner annular wall 70 that is sufficiently offset, or sufficiently aft of the geared architecture 46, so as to provide clearance for service tubes 92 laterally extending from the oil manifold 90. Additionally, the outer annular wall 68 as well as the vanes 72 may be cast and circumferentially coupled about the inner annular wall 70 to further define the core flow path C.

In step 94-2, the integral stock piece may be machined to form an integral flex support 56 having at least one flex member 78 configured to at least partially suppress or absorb torsional loads and other vibrations which may exist between at least the central body support 60 and the geared architecture 46. For example, the flex member 78 may be machined with one or more geometric structures or features, such as folds, bends, or the like, configured to substantially isolate the engine static structure 34 from axial loads and stresses along the inner and/or outer shafts 38, 48 of the engine 20 once installed. The flex support 56 may further be machined with forward facing portions or fore sections 74 configured to be removably coupled to corresponding portions of the geared architecture 46 using fasteners 76, such as bolts, or the like. The flex support 56 may additionally be machined with rearward facing portions or aft sections 82 configured to be removably coupled to the bearing support 62 using fasteners 76, such as bolts, or the like.

In step 94-3, the front architecture, for example, including at least the central body support 60 and the inner annular wall 70 and flex support 56 integral thereto, may be coupled between the geared architecture 46 and the bearing package 36. Specifically, the fore section 74 of the flex support 56 may be coupled to the geared architecture 46, or a suitable outer frame or structure thereof, using fasteners 76, such as bolts, or the like. Moreover, the coupling between the flex support 56 and the geared architecture 46 may be configured to provide sufficient axial clearance for service tubes 92 leading to the oil manifold 90. The aft section 82 of the flex support 56 may similarly be coupled to the bearing support 62 associated with the bearing package 36 using fasteners 76, such as bolts, or the like. In further modifications, the aft section 82 of the flex support 56 and the bearing support 62 may be coupled so as to form an oil seal 84 configured to lubricate the lower bearings 86 of one or more exit guide vanes 88.

Although particular step sequences are shown, described, and claimed, it should be understood that steps may be performed in any order, separated or combined unless otherwise indicated and will still benefit from the present invention.

Although the different examples have specific components shown in the illustrations, embodiments of the present disclosure are not limited to those particular combinations. It is possible to use some of the components or features from one of the examples in combination with features or components from another one of the examples.

The foregoing disclosure is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the present disclosure may be practiced other than as specifically described. For that reason, the appended claims should be studied to determine true scope and content.

What is claimed is:
1. A gas turbine engine comprising:
a geared architecture interconnecting a spool and a fan rotatable about an axis;
a central body support providing an annular wall for a core flow path and an integral flex support inwardly extending therefrom, the integral flex support coupling the geared architecture to the central body support and the integral flex support is disposed substantially aft of the geared architecture so as to provide sufficient axial clearance to an oil manifold associated with the geared architecture; and a bearing package having a bearing support removably coupled to the integral flex support.

2. The gas turbine engine of claim 1, wherein the integral flex support includes at least one flex member configured to at least partially suppress vibrations within the gas turbine engine.

3. The gas turbine engine of claim 2, wherein the at least one flex member is geometrically structured to at least partially suppress vibrations within the gas turbine engine.

4. The gas turbine engine of claim 2, wherein the at least one flex member is configured to at least partially suppress vibrations between the central body support and at least the geared architecture.

5. The gas turbine engine of claim 1, wherein at least the integral flex support and the annular wall are formed of a unitary body.

6. The gas turbine engine of claim 1, wherein the integral flex support is configured to form an oil seal with the bearing support, the oil seal being configured to lubricate lower bearings associated with one or more exit guide vanes associated with the gas turbine engine.

7. The gas turbine engine of claim 1, wherein the integral flex support further includes a retaining member configured to axially retain a fan assembly associated with the gas turbine engine.

8. A central body support for a gas turbine engine, comprising:
an outer annular wall;
an inner annular wall defining a core flow path with the outer annular wall;
a plurality of vanes circumferentially disposed between the outer and inner annular walls; and
an integral flex support inwardly extending from the inner annular wall, the integral flex support including at least one flex member configured to at least partially suppress vibrations within the gas turbine engine and the integral flex support is configured to removably couple to a bearing support associated with a bearing package of the gas turbine engine, the integral flex support forming an oil seal with the bearing support for lubricating lower bearings associated with one or more exit guide vanes.

9. The central body support of claim 8, wherein the at least one flex member is geometrically structured to at least partially suppress vibrations within the gas turbine engine.

10. The central body support of claim 8, wherein the integral flex support is configured to couple to a geared architecture of the gas turbine engine.

11. The central body support of claim 10, wherein the at least one flex member is configured to at least partially suppress vibrations between the inner annular wall and at least the geared architecture.

12. The central body support of claim 10, wherein the integral flex support is disposed substantially aft of the geared architecture so as to provide sufficient axial clearance to an oil manifold associated with the geared architecture.

13. The central body support of claim 8, wherein the integral flex support further includes a retaining member configured to axially retain a fan assembly associated with the gas turbine engine.

14. The central body support of claim 8, wherein at least the integral flex support and the inner annular wall are formed of a unitary body.

15. A method of manufacturing a front architecture of a gas turbine engine, comprising the steps of:
casting a central body support having an annular wall for a core flow path and an integral stock piece inwardly extending therefrom;
machining the integral stock piece to form an integral flex support having at least one flex member, the integral flex support being machined to be disposed substantially aft of a geared architecture so as to provide sufficient axial clearance to an oil manifold associated with the geared architecture; and
removably coupling a fore section of the integral flex support to the geared architecture and an aft section of the integral flex support to a bearing support.

16. The method of claim 15, wherein the at least one flex member is machined with at least one geometric structure configured to at least partially suppress vibrations between the central body support and at least the geared architecture.

17. The method of claim 15, wherein the integral flex support and the bearing support are removably coupled to form an oil seal about lower bearings associated with one or more exit guide vanes.

* * * * *